US009189865B2

(12) United States Patent
Hasegawa et al.

(10) Patent No.: US 9,189,865 B2
(45) Date of Patent: Nov. 17, 2015

(54) IMAGE PROCESSING DEVICE, IMAGE PROCESSING METHOD AND COMPUTER READABLE STORAGE MEDIUM

(71) Applicants: CASIO COMPUTER CO., LTD., Shibuya-ku, Tokyo (JP); CASIO ELECTRONICS MANUFACTURING CO., LTD., Iruma-shi, Saitama (JP)

(72) Inventors: Hirokazu Hasegawa, Koganei (JP); Hisao Aihara, Fuefuki (JP); Toshiaki Kanamura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 156 days.

(21) Appl. No.: 14/029,535

(22) Filed: Sep. 17, 2013

(65) Prior Publication Data

US 2014/0079318 A1     Mar. 20, 2014

(30) Foreign Application Priority Data

Sep. 20, 2012   (JP) ................. 2012-206840

(51) Int. Cl.
| | |
|---|---|
| *G06K 9/00* | (2006.01) |
| *G06K 9/32* | (2006.01) |
| *G06T 7/40* | (2006.01) |
| *G06F 3/01* | (2006.01) |
| *G06F 3/0488* | (2013.01) |
| *G06F 3/03* | (2006.01) |
| *G06F 3/0484* | (2013.01) |
| *H04N 1/387* | (2006.01) |

(52) U.S. Cl.
CPC ............ *G06T 7/408* (2013.01); *G06F 3/017* (2013.01); *G06F 3/0304* (2013.01); *G06F 3/0488* (2013.01); *G06F 3/04842* (2013.01); *H04N 1/3872* (2013.01)

(58) Field of Classification Search
USPC .................................................. 382/165, 295
See application file for complete search history.

(56) References Cited

U.S. PATENT DOCUMENTS

| | | | |
|---|---|---|---|
| 7,762,671 B2 | 7/2010 | Saito | |
| 2002/0141066 A1* | 10/2002 | Nakamura et al. | ............ 359/618 |
| 2005/0184966 A1* | 8/2005 | Katsuyama | ................... 345/173 |
| 2009/0040178 A1* | 2/2009 | Machida et al. | ............... 345/158 |
| 2009/0184924 A1* | 7/2009 | Uchida | ......................... 345/157 |
| 2010/0253957 A1* | 10/2010 | Sano et al. | ..................... 358/1.9 |

FOREIGN PATENT DOCUMENTS

JP      2006-121181 A     5/2006

* cited by examiner

*Primary Examiner* — Kanjibhai Patel
(74) *Attorney, Agent, or Firm* — Holtz, Holtz, Goodman & Chick PC

(57) ABSTRACT

An image processing device includes an extraction unit, a judgment unit, a restoration unit and a specification unit. The extraction unit specifies a first same-color area having a color similar to a color of a pointer in a pre-pointed image of a subject not overlapped by the pointer to extract a pointer portion from a being-pointed image of the subject overlapped by the pointer on the basis of the first same-color area. The restoration unit restores a dividing portion of the pointer portion using a surrounding image of the dividing portion when the judgment unit judges that the pointer portion is divided. The specification unit specifies a pointed position pointed with the pointer on the subject on the basis of a shape of the restored pointer portion.

14 Claims, 16 Drawing Sheets

IMAGE PROCESSING DEVICE, IMAGE PROCESSING METHOD AND COMPUTER READABLE STORAGE MEDIUM

CROSS REFERENCE TO RELATED APPLICATION

This application is based upon and claims the benefit of priority under 35 USC 119 of Japanese Patent Application No. 2012-206840 filed on Sep. 20, 2012, the entire disclosure of which, including the description, claims, drawings and abstract, is incorporated herein by reference in its entirety.

BACKGROUND OF THE INVENTION

1. Field of the Invention

The present invention relates to an image processing device, an image processing method and a computer readable storage medium.

2. Description of Related Art

Hitherto there has been known a projection device such as a projector by which a particular area in a projected image is highlighted by selecting the area using a pointer such as a laser pointer, which is disclosed, for example, in Japanese Patent Application Laid-Open Publication No. 2006-121181. In order to carry out such highlighting, a projected image is photographed, and predetermined image processing is performed on the photographed image to specify a pointed portion pointed with the pointer, whereby the selected area is recognized. When the pointed portion pointed with the pointer is specified by image processing, the pointer is detected from the photographed image on the basis of a color of the pointer. If the pointer is a finger or a pointing stick (rod), the whole finger or pointing stick, namely, the pointer itself, functions as the pointer. If the pointer is a laser pointer, a laser beam projected on an image functions as the pointer.

SUMMARY OF THE INVENTION

When the pointed portion pointed with the pointer is specified by image processing, the pointer is detected from a photographed image on the basis of a color of the pointer. However, if an area having a color similar to the color of the pointer exists in the photographed image, the area may be falsely detected as the pointer.

In view of the circumstances, objects of the present invention include improving detection accuracy of a pointer even when an area having a color similar to a color of the pointer exists in a projected image.

In order to achieve at least one of the objects, according to a first aspect of the present invention, there is provided an image processing device including: an imaging unit which images a subject; a first imaging control unit which obtains, as a pre-pointed image, an image captured by the imaging unit imaging the subject not overlapped by a pointer; a second imaging control unit which obtains, as a being-pointed image, an image captured by the imaging unit imaging the subject overlapped by the pointer; an extraction unit which specifies a first same-color area having a color similar to a color of the pointer in the pre-pointed image to extract a pointer portion from the being-pointed image on the basis of the first same-color area; a judgment unit which judges whether or not the extracted pointer portion is divided; a restoration unit which restores a dividing portion of the pointer portion using a surrounding image of the dividing portion when the judgment unit judges that the pointer portion is divided; and a specification unit which specifies a pointed position on the subject on the basis of a shape of the restored pointer portion, the pointed position being pointed with the pointer.

In order to achieve at least one of the objects, according to a second aspect of the present invention, there is provided an image processing method including: a first imaging processing of imaging a subject not overlapped by a pointer to obtain a captured image as a pre-pointed image; a second imaging processing of imaging the subject overlapped by the pointer to obtain a captured image as a being-pointed image; an extraction processing of specifying a first same-color area having a color similar to a color of the pointer in the pre-pointed image to extract a pointer portion from the being-pointed image on the basis of the first same-color area; a judgment processing of judging whether or not the extracted pointer portion is divided; a restoration processing of restoring a dividing portion of the pointer portion using a surrounding image of the dividing portion when the pointer portion is judged as being divided in the judgment processing; and a specification processing of specifying a pointed position on the subject on the basis of a shape of the restored pointer portion, the pointed position being pointed with the pointer.

In order to achieve at least one of the objects, according to a third aspect of the present invention, there is provided a non-transitory computer readable storage medium having a program stored thereon for controlling a computer used in an image processing device, the program including computer-executable instructions to perform: a first imaging processing of imaging a subject not overlapped by a pointer to obtain a captured image as a pre-pointed image; a second imaging processing of imaging the subject overlapped by the pointer to obtain a captured image as a being-pointed image; an extraction processing of specifying a first same-color area having a color similar to a color of the pointer in the pre-pointed image to extract a pointer portion from the being-pointed image on the basis of the first same-color area; a judgment processing of judging whether or not the extracted pointer portion is divided; a restoration processing of restoring a dividing portion of the pointer portion using a surrounding image of the dividing portion when the pointer portion is judged as being divided in the judgment processing; and a specification processing of specifying a pointed position on the subject on the basis of a shape of the restored pointer portion, the pointed position being pointed with the pointer.

BRIEF DESCRIPTION OF THE DRAWINGS

The present invention will become more fully understood from the detailed description given hereinafter and the appended drawings, which are given by way of illustration only, and thus are not intended as a definition of the limits of the present invention, wherein.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
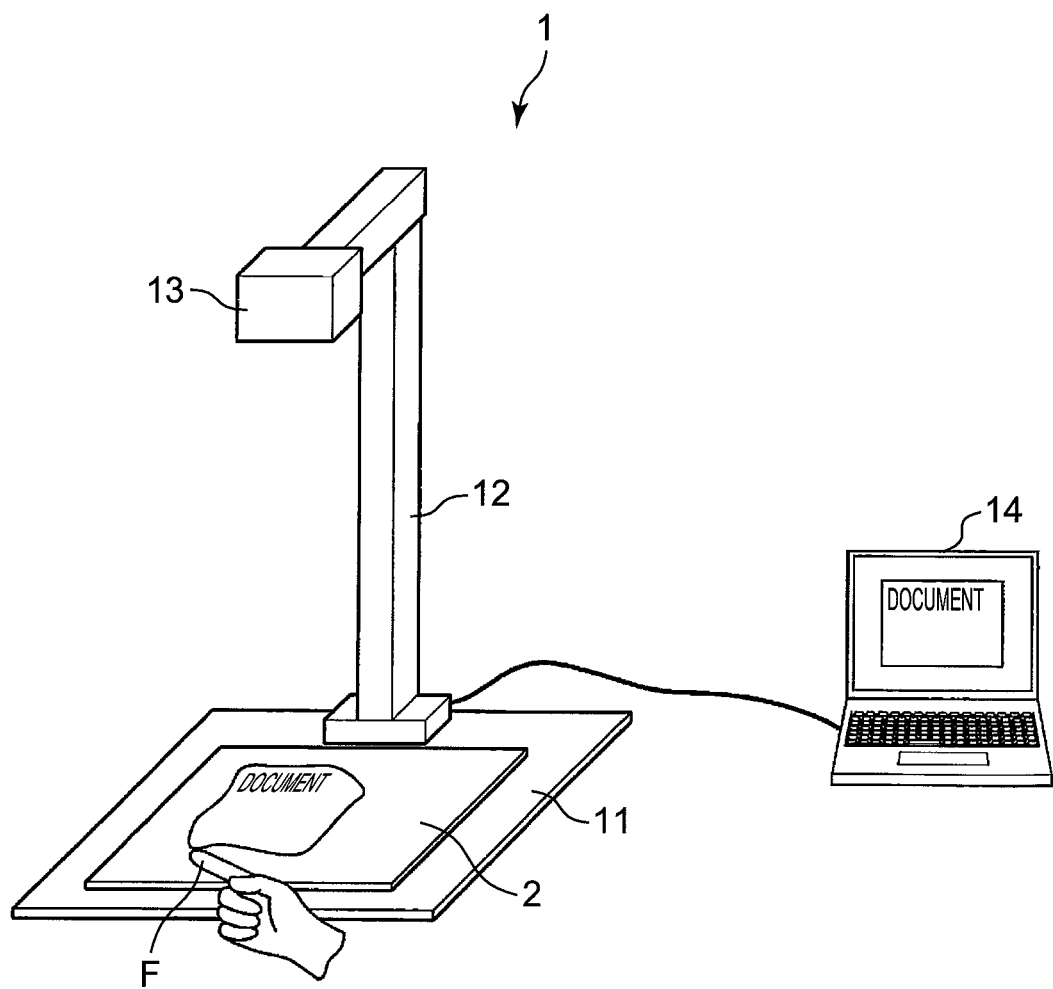
FIG. 1 is a perspective view schematically showing the configuration of a document camera device as an image processing device according to an embodiment.

FIG. 1 is a perspective view schematically showing the configuration of an image processing device according to an embodiment of the invention. As shown in FIG. 1, a document camera device 1 as the image processing device of the invention includes: a base 11 on which a document 2 is placed; a stand part 12 standing on the base 11; a camera 13 as an imaging unit which is mounted on the upper end of the stand part 12 and which images the document 2 on the base 11; and a personal computer 14 connected to the camera 13 through a cable or radio system.

The document 2 is a subject (for photography) of the invention and is set on the base 11 such that the document 2 is within an imaging area of the camera 13. In FIG. 1, a planer document 2 is shown as an example of the subject. However, the subject can be a book or another solid object. If a certain area in the document 2 is pointed with a pointer such as a finger F, the finger F is also imaged by the camera 13. The camera 13 is capable of switching between a high resolution mode and a low resolution mode. The high resolution mode is for imaging at high resolution. The low resolution mode is for imaging at resolution lower than the resolution of the high resolution mode.

Figure 2:
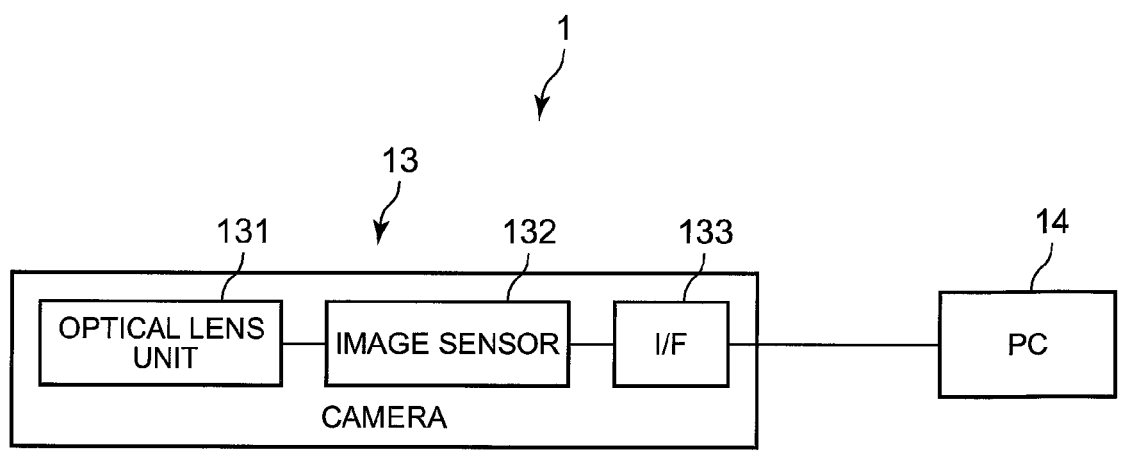
FIG. 2 is a block diagram showing the main control configuration of the document camera device in FIG. 1.

FIG. 2 is a block diagram showing the main control configuration of the document camera device 1 in FIG. 1. As shown in FIG. 2, the camera 13 includes: an optical lens unit 131 which is capable of, for example, adjusting the focal position; an image sensor 132 which converts subject images passed through the optical lens unit 131 into digital signals; and an I/F 133 which outputs the digital signals made by the image sensor 132 to the computer 14.

The computer 14 always monitors the digital signals input from the camera 13. The computer 14 obtains, as a pre-pointed image 5, an image captured by the camera 13 imaging the document 2 not overlapped by the finger F (see FIG. 5A to FIG. 5C). Further, the computer 14 obtains, as a being-pointed image 6, an image captured by the camera 13 imaging the document 2 overlapped by the finger F (see FIG. 8A to FIG. 8E). Thus the computer 14 is a first imaging control unit and a second imaging control unit of the invention. The computer 14 specifies a pointed position on the document 2 pointed with the finger F on the basis of the obtained pre-pointed image 5 and being-pointed image 6. Further, the computer 14 cuts out a portion of an image of the document 2 on the basis of a plurality of pointed position specified as described above.

Figure 3:
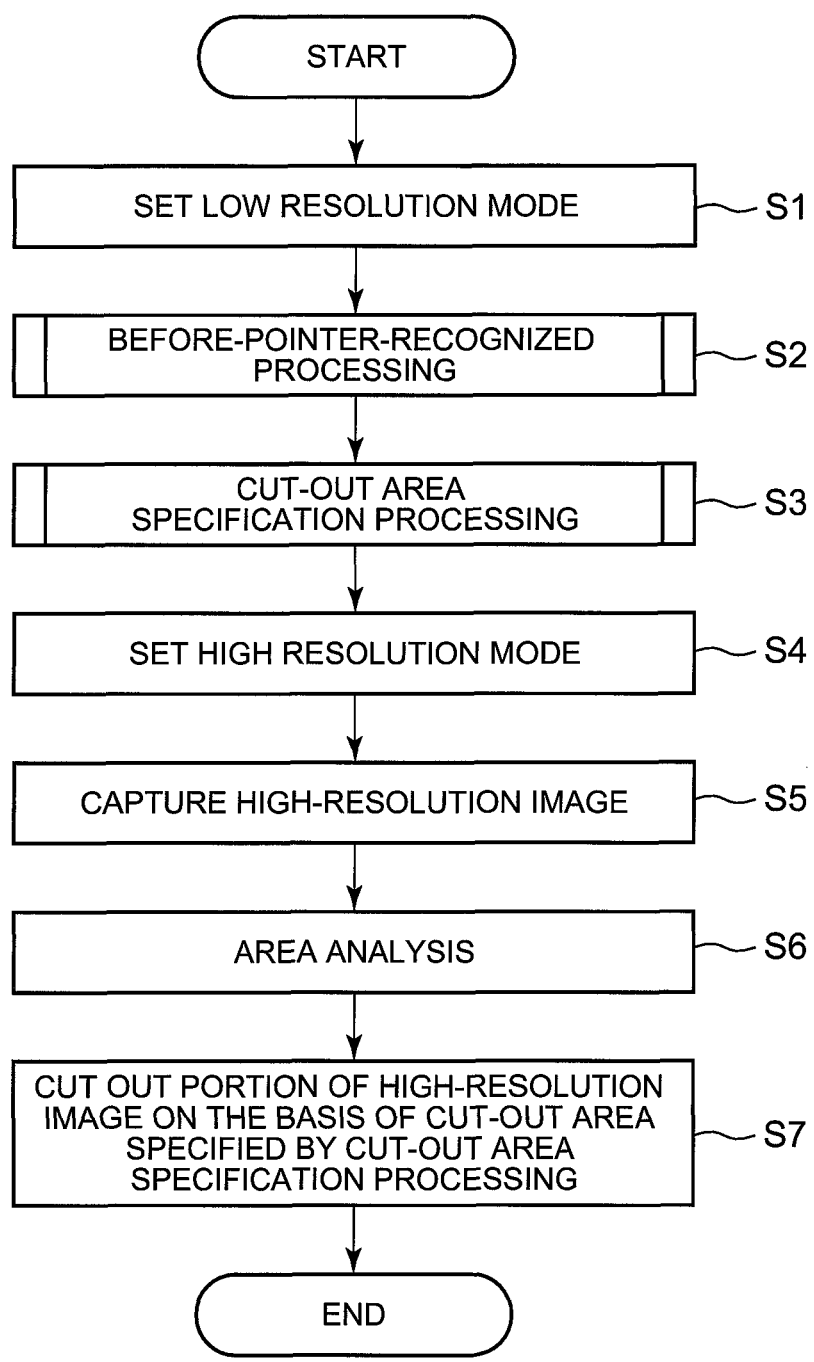
FIG. 3 is a flowchart of cut-out processing according to the embodiment.

Hereinafter, cut-out processing on an image will be detailed. FIG. 3 is a flowchart of the cut-out processing.

First, an operator inputs a command for starting the cut-out processing into the computer 14 by operating an operation unit thereof such as a mouse or a keyboard. On the basis of the command, the computer 14 executes a program of the invention to initialize the camera 13. While being initialized, the camera 13 is set at a low resolution mode (step S1).

During the time, the camera 13 performs imaging, and images captured by the camera 13 are sent to the computer 14 to be displayed on a display of the computer 14. The operator adjusts the position of the document 2 in such a way as to guide the document 2 to the most appropriate position, watching the displayed images.

After the position of the document 2 is determined, the operator operates the operation unit to make the processing proceed to the following steps.

Figure 4:
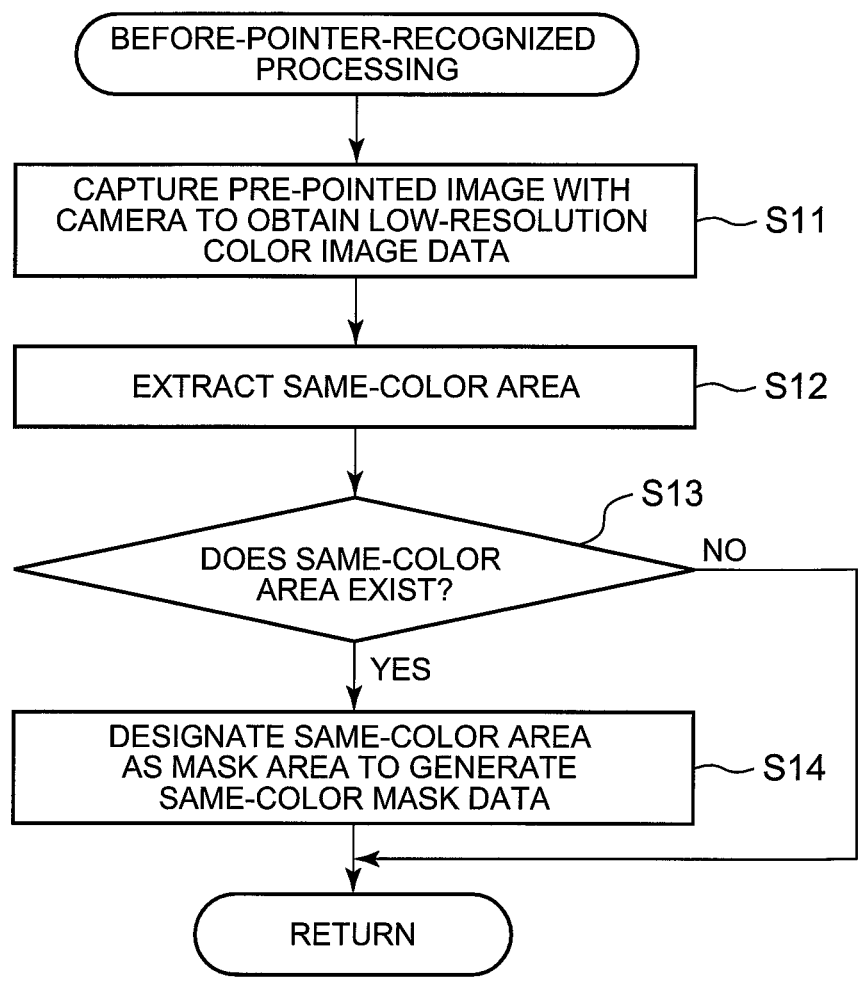
FIG. 4 is a flowchart of before-pointer-recognized processing according to the embodiment.
Figure 5A:
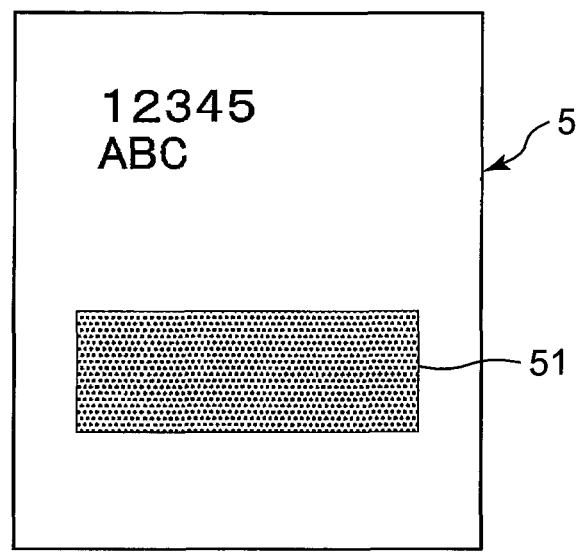
FIG. 5A to FIG. 5C illustrate transition of a captured image in the before-pointer-recognized processing in FIG. 4.
Figure 5B:
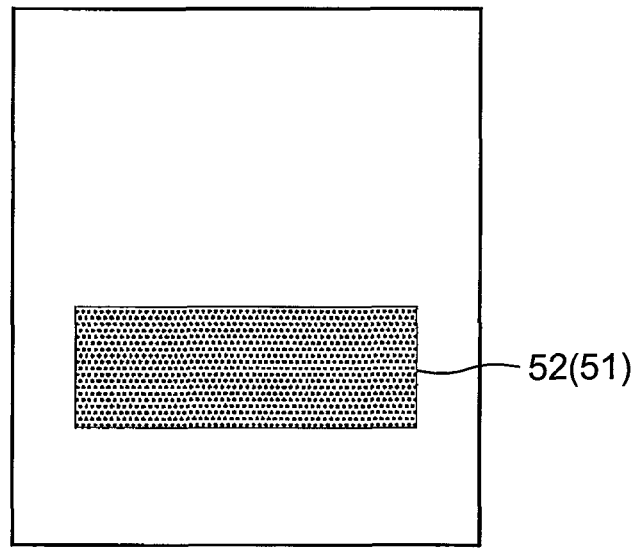
Figure 5C:
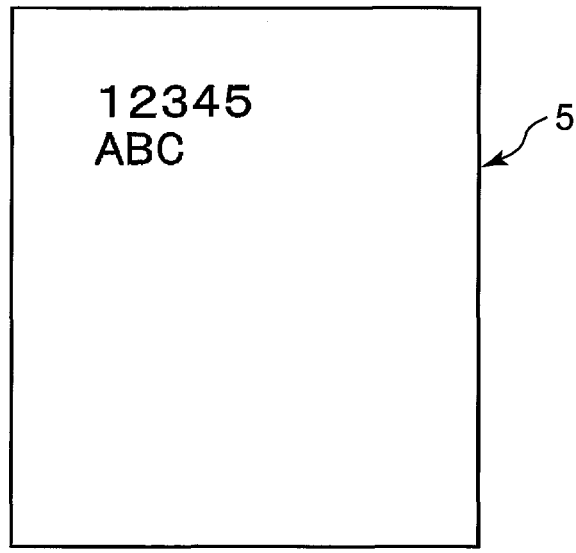

In Step S2, the computer 14 performs before-pointer-recognized processing. FIG. 4 is a flowchart of the before-pointer-recognized processing. FIG. 5A to FIG. 5C illustrate transition of a captured image in the before-pointer-recognized processing. FIG. 5A shows a pre-pointed image 5, FIG. 5B shows a mask area, and FIG. 5C shows the pre-pointed image 5 from which a same-color area 51 has been deleted.

The mask area is an area as which a same-color area is designated. The mask area will be detailed with the same-color area later.

As shown in FIG. 4, in Step S11, the computer 14 controls the camera 13 so that a pre-pointed image 5 of the document 2 not overlapped by the finger F (see FIG. 5A) is captured to obtain low-resolution color image data thereof (a first imaging step).

In Step S12, the computer 14 extracts the same-color area 51 (a first same-color area) from the obtained pre-pointed image 5 (a same-color area extraction step). Thus the computer 14 is a same-color area extraction unit of the invention. The same-color area 51 is an area having a color similar to skin color if the pointer is the finger F.

The skin color differs between races such as the white race, the black race, the yellow race, etc. The skin color also differs between individuals. Further, the skin color of one person could change depending on the season. Hence, a recognizable range of skin color (the pointer's color) may be set, in advance, such that these colors are recognized as the skin color (the color of the pointer). Alternatively, a recognizable range of skin color may be registered for each race so that a recognizable range can be selected from the registered ranges in accordance with the race of a person whose finger (finger F) is used as the pointer.

If the pointer is something other than the finger F such as a pointing stick (rod) or a laser pointer, the same-color area 51 is an area having a color similar to a color of the pointer.

In any of the above cases, the pointer could be imaged with a color somewhat different from its actual color depending on lighting. Therefore it is preferable to set an acceptable range of the pointer's color, so that an area having a color similar to the color of the pointer can be recognized as a same-color area.

In Step S13 of FIG. 4, the computer 14 judges whether or not the same-color area 51 exists in the pre-pointed image 5. When judging that no same-color area 51 exists, the computer 14 ends the before-pointer-recognized processing and proceeds to Step S3. When judging that the same-color area 51 exists, the computer 14 proceeds to Step S14.

In Step S14, the computer 14 designates the same-color area 51 as a mask area 52 shown in FIG. 5B and generates same-color mask data (a designation step). Thus the computer 14 is a designation unit of the invention.

When image processing is performed on the pre-pointed image 5 on the basis of the same-color mask data, the pre-pointed image 5 from which the same-color area 51 has been deleted shown in FIG. 5C is generated. After generating the same-color mask data, the computer 14 ends the before-pointer-recognized processing and proceeds to Step S3.

Figure 6:
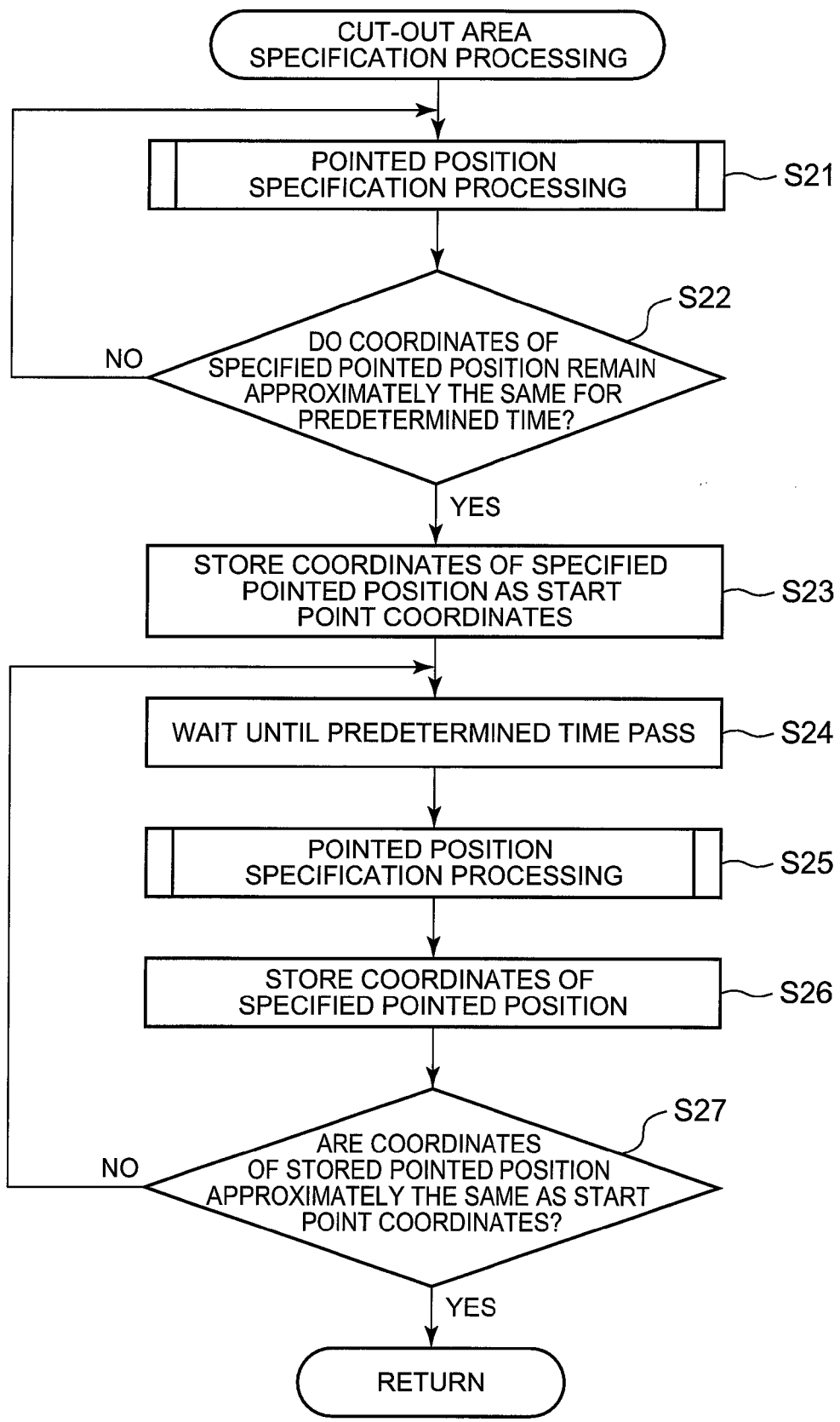
FIG. 6 is a flowchart of cut-out area specification processing according to the embodiment.

In Step S3 of FIG. 3, the computer 14 performs cut-out area specification processing. FIG. 6 is a flowchart of the cut-out area specification processing.

Figure 7:
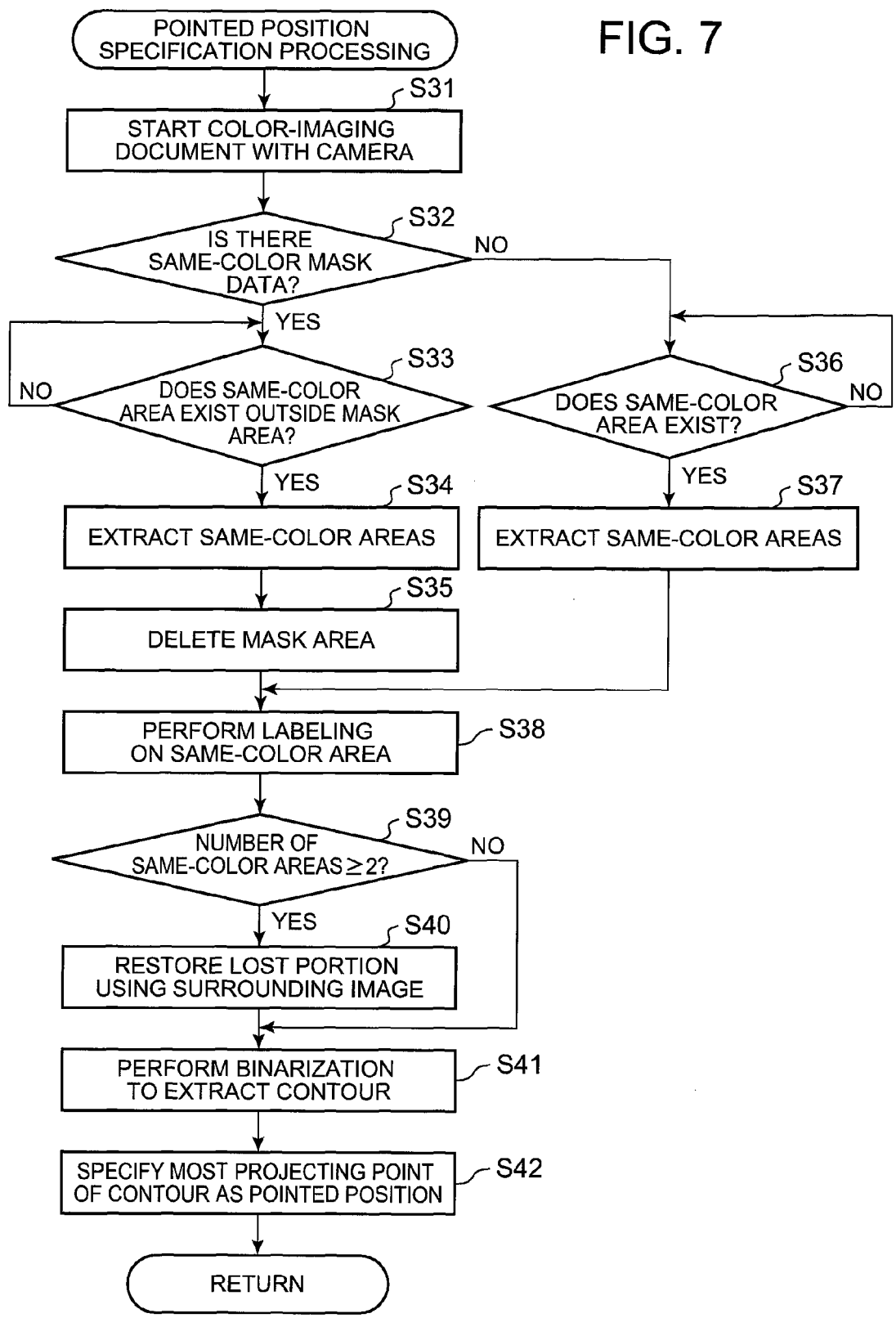
FIG. 7 is a flowchart of pointed position specification processing according to the embodiment.

In Step S21, the computer 14 performs pointed position specification processing. FIG. 7 is a flowchart of the pointed position specification processing. FIG. 8A to FIG. 8E illustrate transition of a captured image in the pointed position specification processing.

In Step S31 of FIG. 7, the computer 14 controls the camera 13 so that color-imaging of the document 2 starts. Then the computer 14 starts monitoring images input from the camera 13 all the time.

In Step S32, the computer 14 judges whether or not there is same-color mask data. When judging that there is same-color mask data, the computer 14 proceeds to Step S33. When judging that there is no same-color mask data, the computer 14 proceeds to Step S36.

Figure 8A:
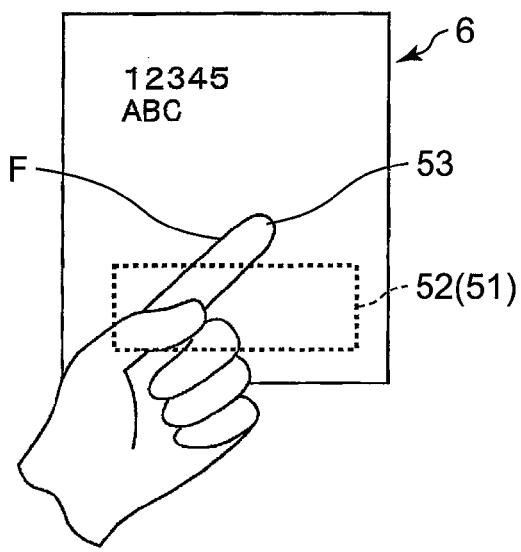
FIG. 8A to FIG. 8E illustrate transition of a captured image in the pointed position specification processing in FIG. 7.

As described above, when judging in Step S32 that there is same-color mask data, the computer 14 proceeds to Step S33. In Step S33, the computer 14 judges whether or not another same-color area (a second same-color area), i.e. a same-color area 53, exists outside the mask area 52 in an image input from the camera 13, the mask area 52 being based on the same-color mask data. When judging that no same-color area 53 exists, the computer 14 makes the camera 13 continue color-imaging. When judging that a same-color area 53 exists, the computer 14 proceeds to Step S34. For example, if the finger F overlaps the document 2 as shown in FIG. 8A, the finger F exists outside the mask area 52 too, so that the computer 14 obtains the image shown in FIG. 8A as a being-pointed image 6 (a second imaging step).

In Step S34, the computer 14 extracts the same-color areas 52 (51) and 53 from the being-pointed image 6.

Figure 8B:
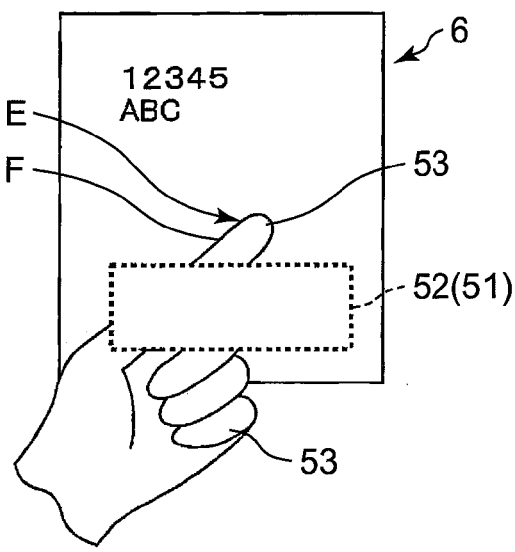

In Step S35, the computer 14 deletes the inside of the mask area 52 from the extracted same-color areas 52 (51) and 53 (a deletion step) and proceeds to Step S38. Thus the computer 14 is a deletion unit of the invention. FIG. 8B shows the being-pointed image 6 from which the inside of the mask area 52 has been deleted.

On the other hand, when judging in Step S32 that there is no same-color mask data, the computer 14 proceeds to Step S36. In Step S36, the computer 14 judges whether or not a same-color area 53 exists in an image input from the camera 13. For example, if the being-pointed image 6 of FIG. 8A without the mask area 52 is the image, the computer 14 judges in Step S36 that a same-color area 53 exists in the image, and if the being-pointed image 6 thereof without the mask area 52 and the finger F is the image, the computer 14 judges in Step S36 that no same-color area 53 exists in the image. When judging that no same-color area 53 exists, the computer 14 makes the camera 13 continue color-imaging. When judging that a same-color area 53 exists, the computer 14 proceeds to Step S37.

In Step S37, the computer 14 extracts the same-color area 53 from the being-pointed image 6 and recognizes the extracted same-color area 53 as a pointer portion E (a pointer extraction step). Then the computer 14 proceeds to Step S38. Thus the computer 14 is a pointer extraction unit of the invention. The steps in which the same-color area 51 is specified in the pre-pointed image 5 and the pointer portion E is extracted from the being-pointed image 6 on the basis of the same-color area 51 constitute an extraction step of the invention. Thus the computer 14 is an extraction unit of the invention.

In Step S38, the computer 14 performs labeling on the same-color area 53 extracted from the being-pointed image 6. For example, if a single same-color area exists in the being-pointed image 6, in other words, if the pointer portion E is not divided, the number of same-color areas is one. On the other hand, if the pointer portion E is divided by the mask area 52 as shown in FIG. 8B, the number of same-color areas is two or more. Even if no mask area 52 exists, the pointer portion E may be divided by, for example, a ring, a watch or a wristband. In this case too, the number of same-color areas is two or more.

In Step S39, the computer 14 judges whether or not the number of same-color areas is two or more (a judgment step). When judging that the number of same-color areas is less than two, the computer 14 proceeds to Step S41 which will be described later. When judging that the number of same-color areas is two or more, the computer 14 proceeds to Step S40. Thus the computer 14 is a judgment unit of the invention.

Figure 8C:
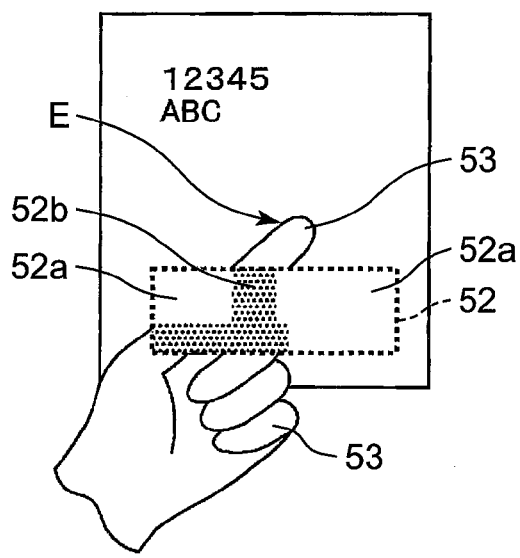

In Step S40, the computer 14 restores a lost portion (a dividing portion) of the pointer portion E using a surrounding image of the lost portion, the lost portion being generated by the division of the pointer portion E (a restoration step). Thus the computer 14 is a restoration unit of the invention. More specifically, as shown in FIG. 8C, the computer 14 takes all the pixels in the mask area 52 as restoration pixels and determines, with respect to each of the restoration pixels, the color of a pixel outside the mask area 52, the pixel being the closest to a restoration pixel, as a color of the restoration pixel. Thus the computer 14 determines the colors of the restoration pixels in the mask area 52 and accordingly determines, among the restoration pixels, restoration pixels which constitute a same-color area 52b. Then the computer 14 proceeds to Step S41. In FIG. 8C, the restoration pixels restored but not constituting a same-color area are shown in blank with a numeral 52a. On the other hand, the restoration pixels restored and constituting a same-color area are patterned and shown with the numeral 52b. If the pointer portion E is divided even though no mask area 52 exists, the computer 14 inserts a virtual frame into the dividing portion. Then the computer 14 assumes that the frame is the mask area 52 and determines the colors of the restoration pixels in the above-described procedure.

Figure 8D:
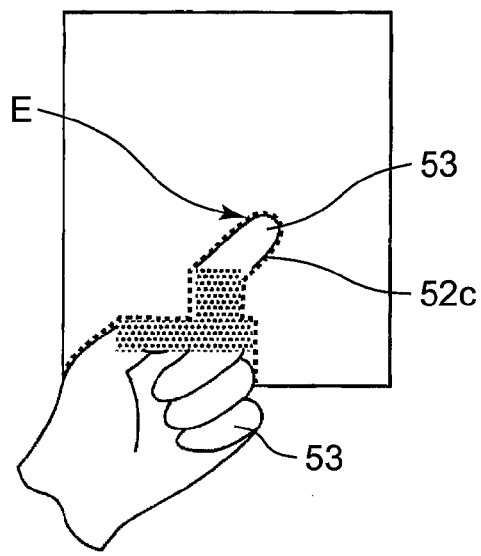

In Step S41, the computer 14 performs binarization so that the contour of the same-color areas 52b and 53 is extracted. FIG. 8D shows a contour 52c (dotted-line portion) of the same-color areas 52b and 53 in the being-pointed image 6 shown in FIG. 8C. If the number of same-color areas is one, no restoration of the pointer portion E is needed. Therefore the computer 14 extracts the contour of the single same-color area.

Figure 8E:
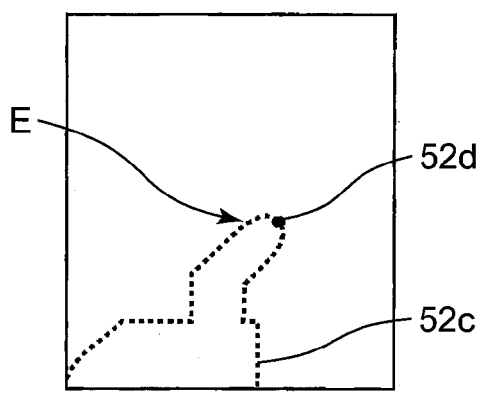

In Step S42, the computer 14 specifies the most projecting point of the contour 52c of the pointer portion E as the pointed position (a specification step). Thus the computer 14 is a specification unit of the invention. FIG. 8E shows the contour 52c only. The most projecting point 52d of the contour 52c is specified as the pointed position. After specifying the pointed position, the computer 14 exits from the processing of FIG. 7 (the processing of Step S21 in FIG. 6) and proceeds to Step S22.

In Step S22, the computer 14 judges whether or not coordinates of the specified pointed position remain approximately the same for a predetermined time. More specifically, the computer 14 performs the processing of Step S21 at intervals of a predetermined time to judge whether or not the coordinates of the specified pointed position remain approximately the same for the predetermined time. The "approximately the same" does not mean completely the same but means the same with a predetermined acceptable range so that it can be judged that the coordinates of the pointed position remain the same even if the pointed position somewhat changes.

When judging in Step S22 that the coordinates of the specified pointed position remain approximately the same for a predetermined time, the computer 14 proceeds to Step S23. In Step S23, the computer 14 stores therein the coordinates of the pointed position specified in Step S21 as start point coordinates.

The predetermined time in Step S22 is set longer than a predetermined time described below so that the start point coordinates are recognized.

In Step S24, the computer 14 waits until a predetermined time passes, the predetermined time being shorter than the above-described predetermined time.

In Step S25, the computer 14 performs pointed position specification processing which is the same as the processing of FIG. 7 (the processing of Step S21 in FIG. 6) to specify the current pointed position.

In Step S26, the computer 14 stores therein coordinates of the pointed position specified in Step S25 after Step S24 in which the computer 14 waits until the predetermined time passes.

Thus the computer 14 stores therein the coordinates of the pointed position specified in Step S25 at intervals of a predetermined time.

In Step S27, the computer 14 judges whether or not the coordinates of the pointed position stored in Step S26 are approximately the same as the start point coordinates. When judging that the coordinates of the pointed position stored in Step S26 are not approximately the same as the start point coordinates, the computer 14 proceeds to Step S24. When judging that the coordinates of the pointed position stored in Step S26 are approximately the same as the start point coordinates, the computer 14 exits from the processing of FIG. 6 (the processing of Step S3 in FIG. 3) and proceeds to Step S4 in FIG. 3. The "approximately the same" does not mean completely the same but means the same with a predetermined acceptable range so that it can be judged that the coordinates of the pointed position are the same as the start point coordinates even if the pointed position somewhat deviates from the start point coordinates.

Thus Steps S24 to S27 are repeated until the pointed position returns to the start point coordinates. Thereby coordinates of a large number of pointed positions pointed with the finger F are stored so that a frame-shaped cut-out area is specified.

Next, an example of operations in the cut-out area specification processing will be detailed. FIG. 9A, FIG. 9B, FIG. 10A and FIG. 10B illustrate an operation procedure in the cut-out area specification processing.

Figure 9A:
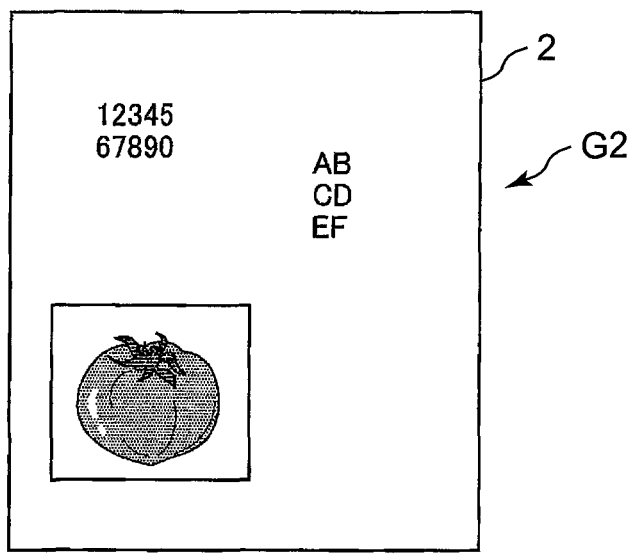
FIG. 9A and FIG. 9B illustrate an operation procedure in the cut-out area specification processing according to the embodiment.

First, as shown in FIG. 9A, the computer 14 makes the camera 13 image the whole document 2 at a low resolution mode to obtain a captured image G2 as a pre-pointed image 5.

Figure 9B:
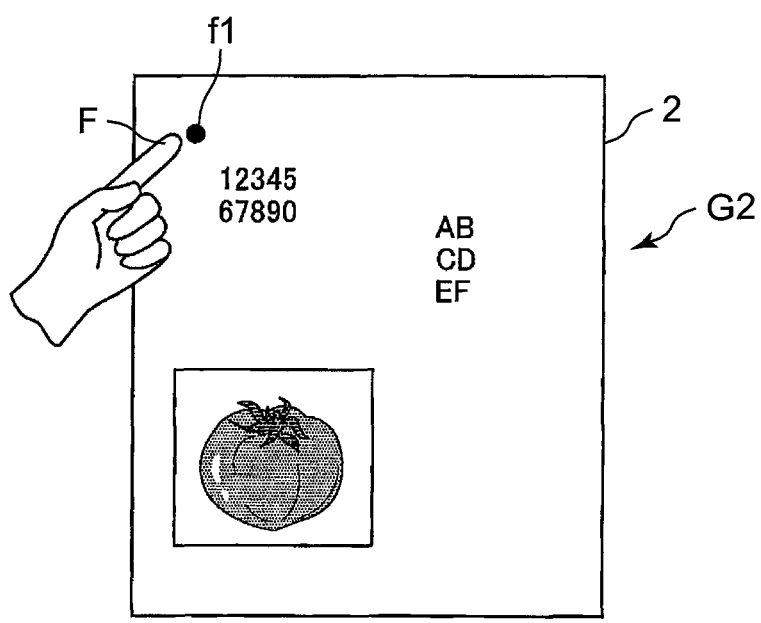

After that, as shown in FIG. 9B, a user places the finger F on the document 2. When a predetermined time passes in this state, the computer 14 recognizes coordinates of the specified pointed position as start point coordinates f1.

Figure 10A:
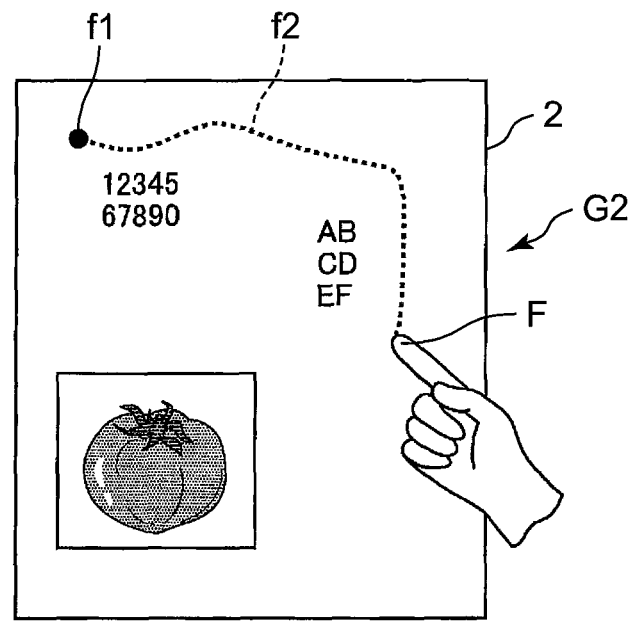
FIG. 10A and FIG. 10B illustrate the operation procedure in the cut-out area specification processing according to the embodiment.

As shown in FIG. 10A, the user moves the finger F. The computer 14 stores therein the pointed position at intervals of a predetermined time to specify (define) a track f2 of the finger F.

Figure 10B:
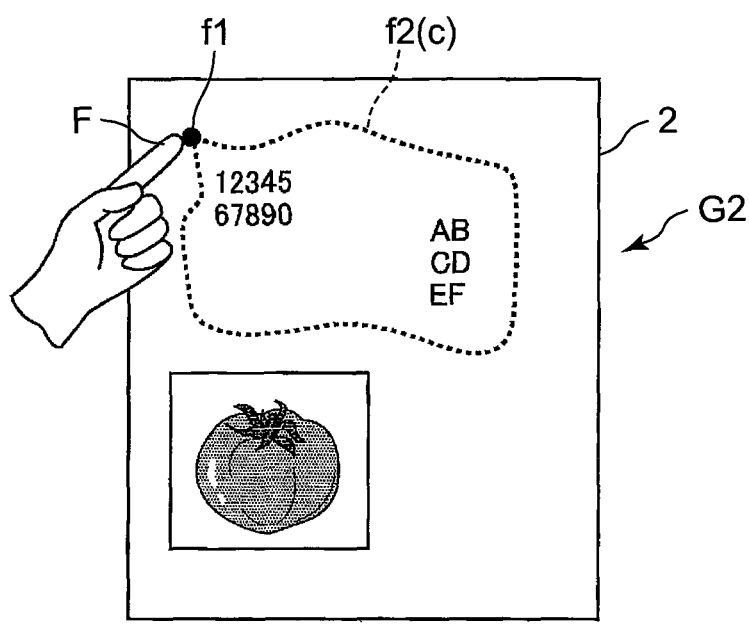

As shown in FIG. 10B, the user moves the finger F and places the finger F near the start point coordinates f1 at the end such that the track f2 encloses a desired area. Thus the computer 14 stores therein the track f2 of the finger F in a form of many coordinates so that the area enclosed by the track f2 is specified as a frame-shaped cut-out area c.

As shown in FIG. 3, in Step S4, the computer 14 sets resolution of the camera 13 at a high resolution mode.

In Step S5, the computer 14 controls the camera 13 so that the camera 13 again images the document 2 not overlapped by the finger F to capture a pre-pointed image 5 to obtain high-resolution color image data thereof as a reference image.

Figure 11A:
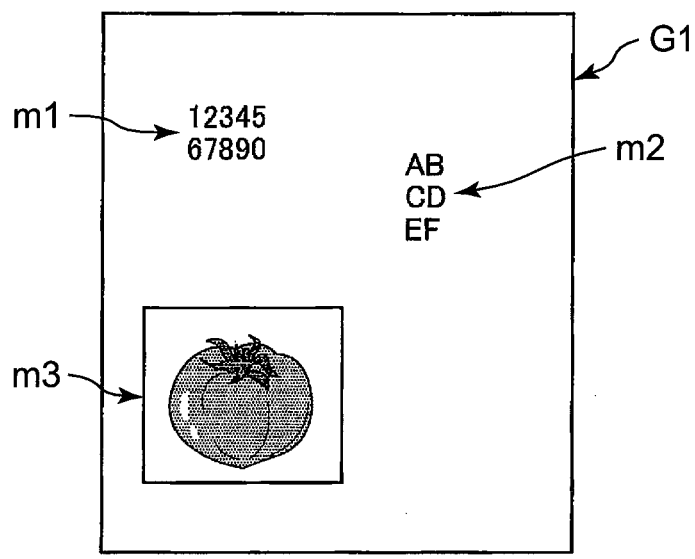
FIG. 11A to FIG. 11C illustrate a procedure of image processing in area analysis according to the embodiment.
Figure 11B:
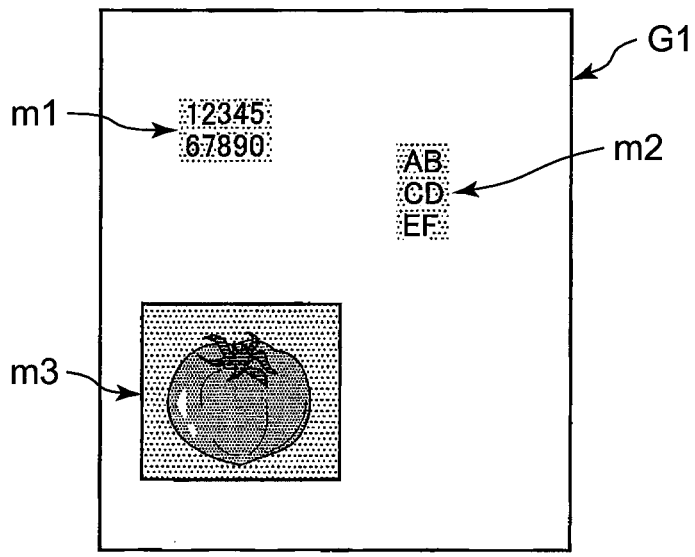
Figure 11C:
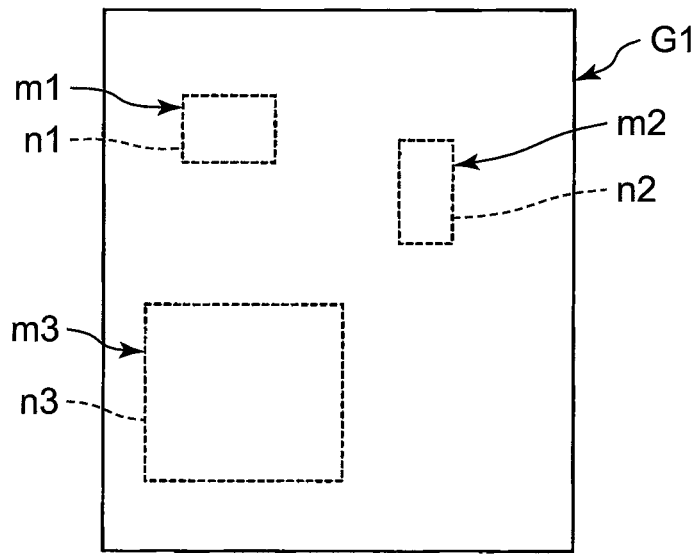

In Step S6, the computer 14 performs area analysis on the reference image. FIG. 11A to FIG. 11C illustrate a procedure of image processing in the area analysis. FIG. 11A shows an example of the reference image. FIG. 11B shows an image obtained by blurring the reference image. FIG. 11C shows an image in which contours of areas in the document 2 are extracted. As shown in FIG. 11A, a reference image G1 includes a first character area m1 consisting of numbers, a second character area m2 consisting of alphabets and an image area m3 consisting of an image.

First, the computer 14 converts the color reference image G1 shown in FIG. 11A into a black-and-white multivalued image. The computer 14 blurs the converted reference image G1 by filtering the reference image G1 in a predetermined manner (see FIG. 11B). Thereby, in each of the areas m1, m2 and m3, pieces constituting the area are united in a single body. Then the computer 14 binarizes the blurred reference image G1 and extracts the contours (contour extraction) (see FIG. 11C). By the contour extraction, each of the contours n1, n2 and n3 of the areas m1, m2 and m3 consists of a sequence of many points. The computer 14 obtains coordinates data of the points of the contours n1, n2 and n3 and stores therein the coordinates data as coordinates data of the areas m1, m2 and m3, respectively.

The computer 14 may perform the area analysis directly on the high-resolution reference image or on a low-resolution reference image after converting the reference image captured at high resolution into the low-resolution reference image. Further, the computer 14 may perform the area analysis with the before-pointer-recognized processing of Step S2.

In Step S7, the computer 14 cuts out a portion of the high-resolution image (reference image G1) on the basis of the cut-out area c specified by the cut-out area specification processing. FIG. 12A to FIG. 12E illustrate an example of specifying an actual cut-out portion on the basis of the cut-out area c. In the following, two kinds of specification methods for specifying an actual cut-out portion will be described. However, other known specification methods therefor can also be used.

Figure 12A:
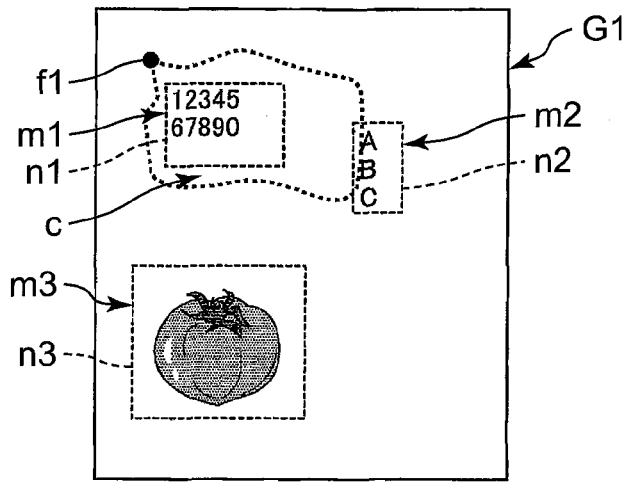
FIG. 12A to FIG. 12E illustrate an example of specifying an actual cut-out portion on the basis of a cut-out area according to the embodiment.

First, as shown in FIG. 12A, the computer 14 puts the cut-out area c on the areas m1, m2 and m3 defined by the contours n1, n2 and n3, respectively.

Figure 12B:
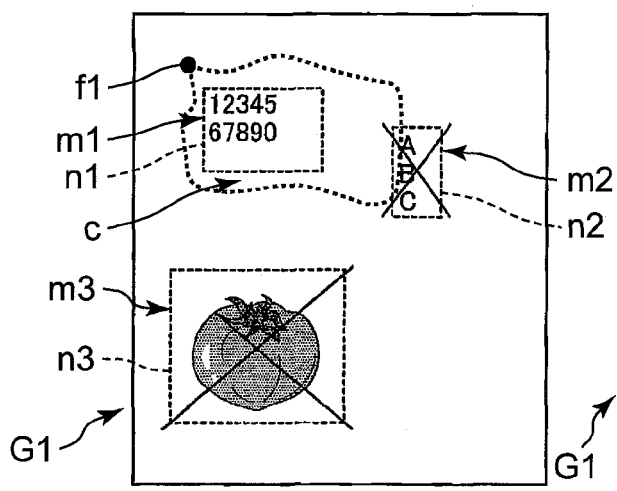
Figure 12C:
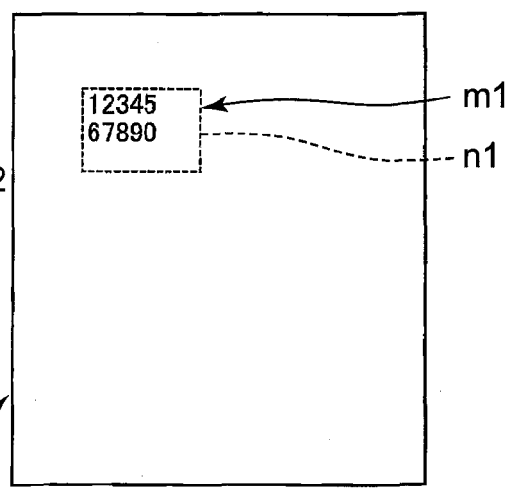

Then, in a first specification method, the computer 14 calculates a percentage of each of the areas m1, m2 and m3 overlapped by the cut-out area c. If the percentage is 50% or more, the computer 14 specifies the area as the actual cut-out portion. More specifically, the computer 14 specifies the first character area m1 as the actual cut-out portion since the first character area m1 is overlapped by the cut-out area c by 100% as shown in FIG. 12B. The computer 14 does not specify the second character area m2 as the actual cut-out portion since the second character area m2 is overlapped by the cut-out area c by about 30%. The computer 14 does not specify the image area m3 as the actual cut-out portion since the image area m3 is not overlapped by the cut-out area c at all. Consequently, the computer 14 cuts out only the first character area m1 from the reference image G1 and stores therein only the first character area m1 as image data as shown in FIG. 12C.

Figure 12D:
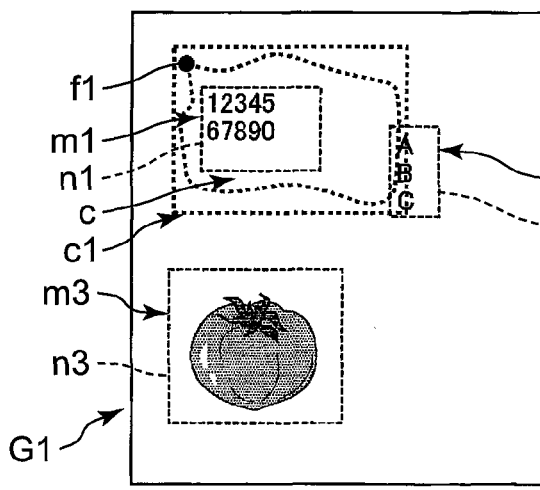
Figure 12E:
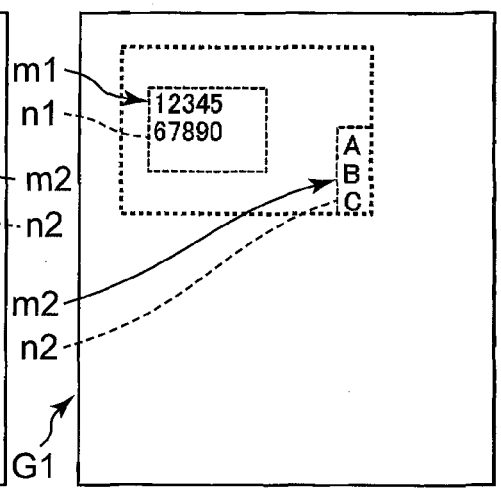

In a second specification method, the computer 14 creates (draws) a rectangular area c1 approximately circumscribing the cut-out area c as shown in FIG. 12D. Then the computer 14 specifies the area at least partially included in the rectangular area c1 as the actual cut-out portion. In FIG. 12D, the first character area m1 and the second character area m2 are each specified as the actual cut-out portion. The image area m3 which is not overlapped by (included in) the rectangular area c1 at all is not specified as the actual cut-out portion. Consequently, the computer 14 cuts out the first character area m1 and the second character area m2 from the reference image G1 and stores therein the first character area m1 and the second character area m2 as image data as shown in FIG. 12E.

The computer 14 performs displaying the portion on the display or printing it with a printer on the basis of the image data of the portions specified as the actual cut-out portions.

As described above, according to the embodiment, the same-color area 51 (first same-color area) having a color similar to a color of the finger F is specified in the pre-pointed image 5, and the pointer portion E is extracted from the being-pointed image 6 on the basis of the same-color area 51. Therefore, even when the same-color area 51 exists in the pre-pointed image 5, the pointer portion E can be extracted from the being-pointed image 6 in anticipation of the same-color area 51 not being the finger F. Accordingly, even when an area having a color similar to a color of a pointer such as the finger F exists in a projected image, the pointer can be detected with a higher degree of accuracy.

Further, when the computer 14 extracts the finger F portion from the being-pointed image 6 and judges that the pointer portion E is divided, the computer 14 restores the dividing portion and specifies the pointed position on the document 2 on the basis of the shape of the restored pointer portion E. Therefore the computer 14 can reliably specify the whole pointer such as the finger F. Accordingly, the computer 14 can detect the pointed position on the document 2 more reliably.

According to the embodiment, resolution in the pointed position specification processing is set lower than resolution in other image processing performed on the basis of the pointed position on an image captured by the camera 13 imaging the subject. Therefore, compared with a case where the pointed position specification processing is performed on a high-resolution image, the processing load can be reduced. Accordingly, the pointed position specification processing can be performed at higher speed.

According to the embodiment, the computer 14 deletes the same-color area 51 in the pre-pointed image 5 as the mask area 52 from the being-pointed image 6. Therefore the same-color area 51 other than the finger F can be prevented from being specified as the finger F portion in the being-pointed image 6.

According to the embodiment, when the same-color area 51 designated as the mask area 52 exists in the being-pointed image 6, the computer 14 deletes the mask area 52 from the being-pointed image 6. This processing is not performed when no designated mask area 52 exists. Therefore the processing as a whole can be performed at higher speed.

According to the embodiment, when the computer 14 does not designate the same-color area 51 as the mask area 52, the computer 14 specifies the pointed position on the basis of the contour shape of a single same-color area which does not need restoration. Therefore the pointed position pointed with the finger F can be reliably specified with no same-color area 51, which is designated as the mask area 52.

Similarly, according to the embodiment, when the computer 14 judges that the number of same-color areas is one, that is to say, when the computer 14 judges that the pointer portion E is not divided, the computer 14 specifies the pointed position on the basis of the contour shape of the single same-color area which does not need restoration. Therefore the pointed position pointed with the finger F can be reliably specified with no same-color area 51, which is designated as the mask area 52.

According to the embodiment, the computer 14 specifies the most projecting point of the restored pointer portion E as the pointed position. Therefore the tip of the finger F as the pointer can be reliably specified on the basis of the shape of the pointer portion E.

According to the embodiment, the pointed position specification processing is repeated at intervals of a predetermined time. Accordingly, obtainment of the being-pointed image 6, extraction of the pointer portion E, judgment of whether or not the pointer portion E is divided, restoration of the pointer portion E and specification of the pointed position are repeated at intervals of the predetermined time. According to the embodiment, since the pointed position specification processing is performed every time on the basis of the being-pointed image 6, which is a still image, the computer 14 can easily specify a plurality of pointed positions.

According to the embodiment, the computer 14 specifies an area enclosed by the track f2 as the cut-out area c, the track f2 being defined by the pointed positions specified at intervals of the predetermined time. Therefore the cut-out area c can be specified through an intuitive operation of drawing an area with the finger F, the area being desired to be cut out.

According to the embodiment, the computer 14 cuts out the specified cut-out area c from the pre-pointed image 5. Therefore only a specific portion of the document 2 can be cut out for storing or printing.

The invention is not limited to the above embodiment and hence can be appropriately modified.

For example, in the embodiment, the pointed position specification processing using the mask area 52 is described. However, for example, pointed position specification processing using differences between a pre-pointed image and a being-pointed image can be used instead. In the explanation hereinafter, the pointed position specification processing using the differences is referred to as second pointed position specification processing.

Figure 13:
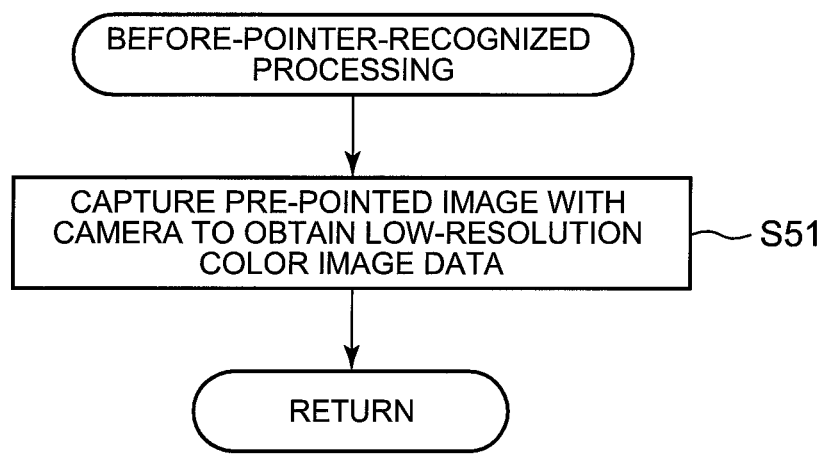
FIG. 13 is a flowchart of before-pointer-recognized processing for second pointed position specification processing according to the embodiment.

In order to perform the second pointed position specification processing, the above-described before-pointer-recognized processing is partially changed. FIG. 13 is a flowchart of the before-pointer-recognized processing for the second pointed position specification processing. In Step S51 of the second before-pointer-recognized processing shown in FIG. 13, the computer 14 makes the camera 13 capture a pre-pointed image 5 to obtain low-resolution color image data thereof. Then the computer 14 proceeds to the second pointed position specification processing of FIG. 14, which corresponds to the pointed position specification processing of FIG. 7 (the processing of Step S21 in FIG. 6).

Figure 14:
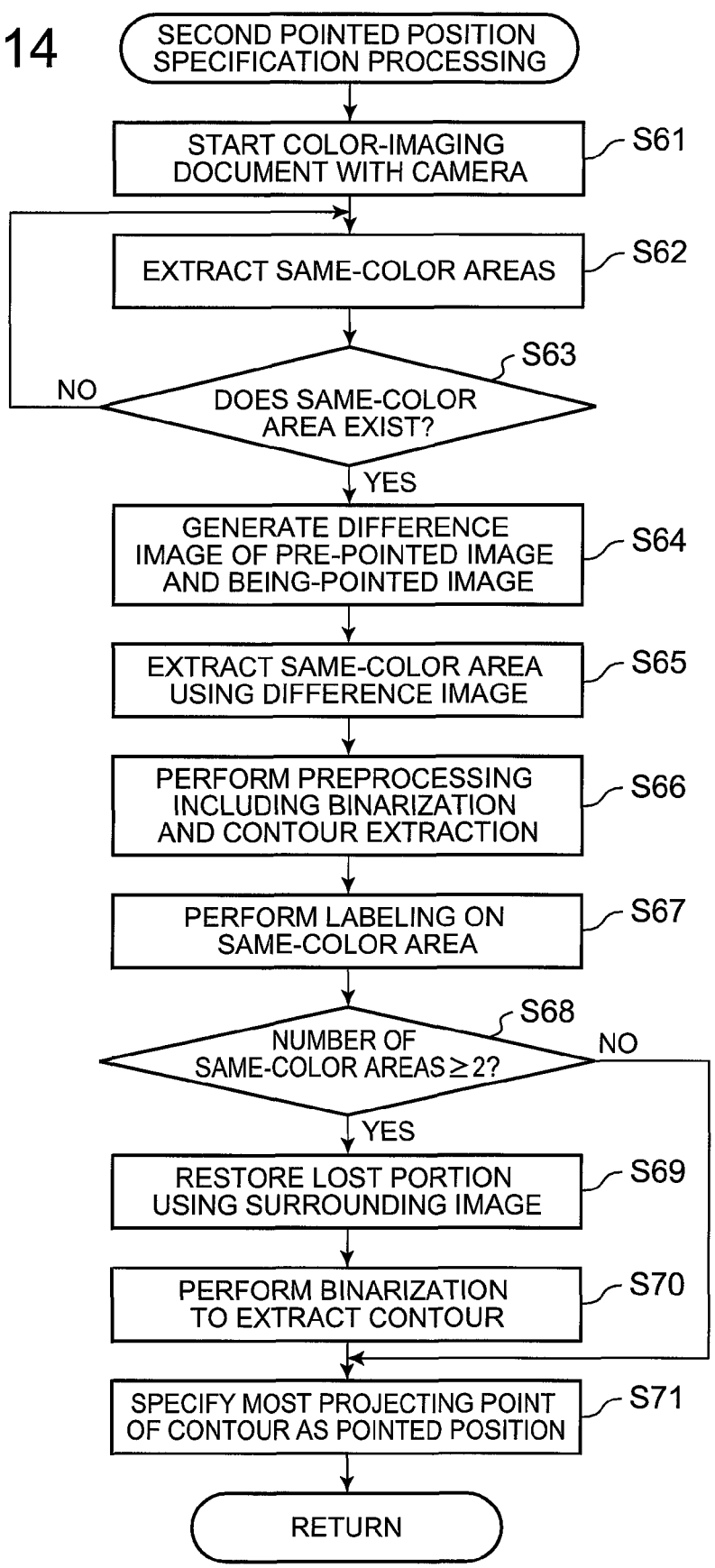
FIG. 14 is a flowchart of the second pointed position specification processing according to the embodiment.
Figure 15A:
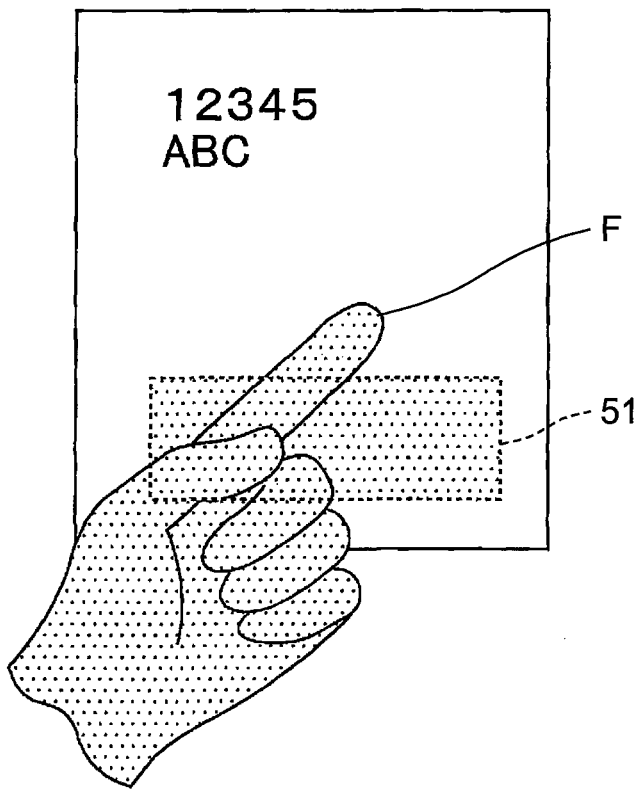
FIG. 15A and FIG. 15B illustrate transition of a captured image in the second pointed position specification processing.
Figure 15B:
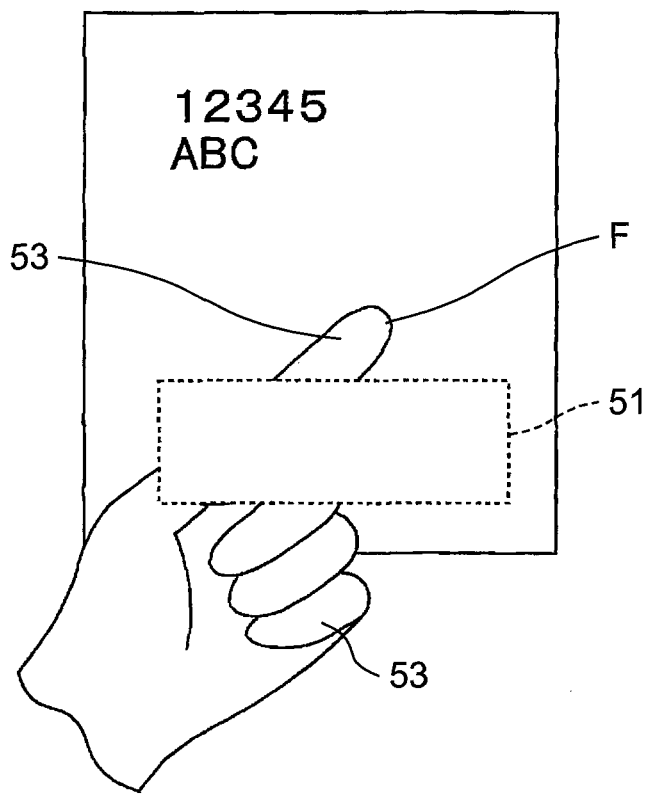

FIG. 14 is a flowchart of the second pointed position specification processing. FIG. 15A and FIG. 15B illustrate transition of a captured image in the second pointed position specification processing.

In Step S61 in FIG. 14, the computer 14 controls the camera 13 so that color-imaging of the document 2 starts. Then the computer 14 starts monitoring images input from the camera 13 all the time.

In Step S62, the computer 14 extracts a same-color area from an image input from the camera 13.

In Step S63, the computer 14 judges whether or not in the image another same-color area exists outside the area recognized as a same-color area in the pre-pointed image 5. When judging that no another same-color area exists, the computer 14 proceeds to Step S62 and makes the camera 13 continue color-imaging. When judging that another same-color area exists, the computer 14 obtains the image as a being-pointed image 6 and proceeds to Step S64. This judgment (Step S63; YES) means that the computer 14 judges that the image becomes the being-pointed image 6 by the finger F entering the imaging area of the camera 13 as shown in FIG. 15A.

In Step S64, the computer 14 generates a difference image of the pre-pointed image 5 and the being-pointed image 6. When no same-color area exists in the pre-pointed image 5, only the finger F portion is shown in the difference image. On the other hand, when the same-color area 51 exists in the pre-pointed image 5, a part of the finger F superposed on the same-color area 51 is recognized as the same-color area 51 in the being-pointed image 6 as shown in FIG. 15A. Consequently, the same-color area 53 outside the same-color area 51 is shown in the difference image as shown in FIG. 15B.

In Step S65, the computer 14 extracts the same-color area 53 from the difference image and recognizes the extracted same-color area 53 as the pointer portion E. The noise such as shades is removed by the extraction of the same-color area 53 in Step S65 (a shade removal step). Thus the computer 14 is a shade removal unit of the invention.

In Step S66, the computer 14 performs preprocessing on the pointer portion E, the preprocessing including binarization and contour extraction which will be described later.

In Step S67, the computer 14 performs labeling on the same-color area 53.

In Step S68, the computer 14, judges whether or not the number of same-color areas is two or more. When judging that the number of same-color areas is less than two, the computer 14 proceeds to Step S71. When judging that the number of same-color areas is two or more, the computer 14 proceeds to Step S69.

In Step S69, the computer 14 restores the lost portion of the pointer portion E using a surrounding image of the lost portion, the lost portion being generated by the division of the pointer portion E, so that the pointer portion E is restored in a color image.

In Step S70, the computer 14 binarizes the restored image and extracts the contour of the pointer portion E.

When judging in Step S68 that the number of same-color areas is less than two, the computer 14 proceeds to Step S71 since binarization and contour extraction have been performed.

In Step S71, the computer 14 specifies the most projecting point 52d of the contour 52c of the pointer portion E as the pointed position (see FIG. 8E).

As described above, according to the embodiment, the computer 14 compares the being-pointed image 6 with the pre-pointed image 5 to extract another same-color area, i.e. the same-color area 53, which is newly added in the being-pointed image 6, as the pointer portion E. Therefore the pointed position can be easily specified by using the difference image.

According to the embodiment, the computer 14 judges whether or not the pointer portion E is divided in the being-pointed image 6 on the basis of the pointer portion E from which the shade portion (shades) has been removed. Therefore the computer 14 can judge whether or not the pointer portion E is divided without being affected by the shades, which are the noise. Accordingly, the judgment can be made with a higher degree of accuracy.

Figure 16:
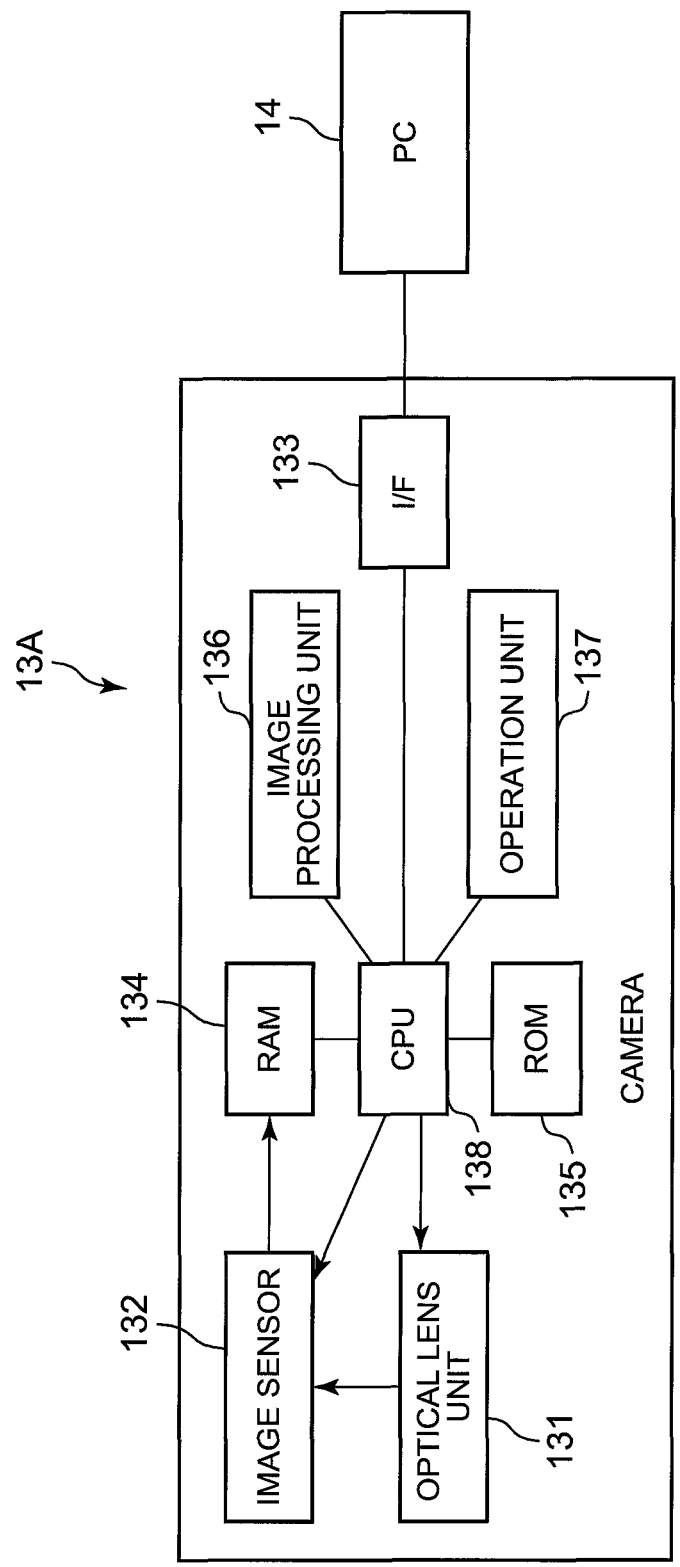
FIG. 16 is a block diagram showing a modification of the document camera device according to the embodiment.

In the above embodiment, the computer 14 performs various types of image processing on the image data obtained by the camera 13 imaging the subject. Alternatively, the camera 13 may perform the various types of image processing on the image data. More specifically, as shown in FIG. 16, a camera 13A includes: the optical lens unit 131; the image sensor 132; a RAM 134 (such as a memory card) in which digital signals made by the image sensor 132 are stored; a ROM 135 (such as EEPROM) in which various programs are stored; an image processing unit 136 which performs the various types of image processing on the image data in the RAM 134; an operation unit 137 through which various commands are input; a CPU 138 which reads the programs in the ROM 135 in response to the commands from the operation unit 137 to control the optical lens unit 131, the image sensor 132, the image processing unit 136 and so on; and the I/F 133 which outputs various data to the computer 14.

In the ROM 135 of the camera 13A, the program of the invention is stored. The CPU 138 of the camera 13A executes the program to perform the cut-out processing. Thus the CPU 138 of the camera 13A is an imaging unit, a first imaging control unit, a second imaging control unit, an extraction unit, a judgment unit, a restoration unit, a same-color area extraction unit, a designation unit, a deletion unit, a pointer extraction unit and a shade removal unit of the invention. The image data cut out by the cut-out processing is sent to the computer 14 to be stored.

Though several embodiments of the present invention are illustrated, the scope of the invention is not limited to the above embodiments but includes the scope of claims attached below and the scope of their equivalents.

What is claimed is:

1. An image processing device comprising:
an imaging unit which images a subject;
a first imaging control unit which obtains, as a pre-pointed image, an image captured by the imaging unit imaging the subject in a state in which the subject is not overlapped by a pointer;
a second imaging control unit which obtains, as a being-pointed image, an image captured by the imaging unit imaging the subject in a state in which the subject is overlapped by the pointer;
an extraction unit which specifies a first same-color area having a color similar to a color of the pointer in the pre-pointed image to extract a pointer portion from the being-pointed image based on the first same-color area;
a judgment unit which judges whether or not the extracted pointer portion is divided;
a restoration unit which performs restoration processing to restore a dividing portion of the pointer portion using a surrounding image of the dividing portion in a case in which the judgment unit judges that the pointer portion is divided; and a specification unit which, in the case in which the judgment unit judges that the pointer portion is divided, specifies a pointed position on the subject based on a shape of the restored pointer portion, the pointed position being pointed with the pointer, wherein in a case in which the judgement unit judges that the extracted pointer portion is not divided, the restoration unit does not restore the pointer portion, and the specification unit specifies the pointed position on the subject based on a shape of the pointer portion which has not been restored.

2. The image processing device according to claim 1, wherein resolution in image processing to specify the pointed position on the subject by the specification unit is set lower than resolution in other image processing performed based on the pointed position on an image captured by the imaging unit imaging the subject.

3. The image processing device according to claim 1, wherein the extraction unit includes:
 a same-color area extraction unit which extracts the first same-color area from the pre-pointed image;
 a designation unit which designates the extracted first same-color area as a mask area in the pre-pointed image;
 a deletion unit which deletes the designated mask area from the being-pointed image; and
 a pointer extraction unit which specifies a second same-color area having a color similar to the color of the pointer in the being-pointed image from which the mask area has been deleted to extract the second same-color area as the pointer portion from the being-pointed image.

4. The image processing device according to claim 3, wherein when the first same-color area designated as the mask area exists in the being-pointed image, the deletion unit deletes the mask area from the being-pointed image.

5. The image processing device according to claim 3, wherein when the first same-color area designated as the mask area does not exist in the being-pointed image, the deletion unit does not delete the mask area from the being-pointed image.

6. The image processing device according to claim 3, wherein when the designation unit does not designate the first same-color area as the mask area, the restoration unit does not restore the pointer portion, and the specification unit specifies the pointed position on the subject based on the shape of the pointer portion which has not been restored.

7. The image processing device according to claim 1, wherein the extraction unit compares the being-pointed image with the pre-pointed image to extract a second same-color area having a color similar to the color of the pointer as the pointer portion from the being-pointed image, the second same-color area being newly added in the being-pointed image.

8. The image processing device according to claim 7, wherein:
 the extraction unit includes a shade removal unit which removes a shade portion from the pointer portion, and the judgment unit judges whether or not the pointer portion is divided in the being-pointed image based on the pointer portion from which the shade portion has been removed.

9. The image processing device according to claim 1, wherein the specification unit specifies a most projecting point of the pointer portion as the pointed position.

10. The image processing device according to claim 1, wherein:

the second imaging control unit obtains the being-pointed image at intervals of a predetermined time to obtain a plurality of being-pointed images, and the specification unit specifies the pointed position on the subject based on the shape of the pointer portion with respect to each of the obtained being-pointed images to specify a plurality of pointed positions.

11. The image processing device according to claim 10, wherein the specification unit specifies an area enclosed by a track defined by the specified pointed positions.

12. The image processing device according to claim 11, further comprising a cut-out unit which cuts out the specified area from the pre-pointed image.

13. An image processing method comprising:
 a first imaging processing of imaging a subject in a state in which the subject is not overlapped by a pointer to obtain a captured image as a pre-pointed image;
 a second imaging processing of imaging the subject in a state in which the subject is overlapped by the pointer to obtain a captured image as a being-pointed image;
 an extraction processing of specifying a first same-color area having a color similar to a color of the pointer in the pre-pointed image to extract a pointer portion from the being-pointed image based on the first same-color area;
 a judgment processing of judging whether or not the extracted pointer portion is divided;
 a restoration processing of restoring a dividing portion of the pointer portion using a surrounding image of the dividing portion in a case in which it is judged in the judgment processing that the pointer portion is divided; and
 a specification processing of specifying, in the case in which it is judged in the judgment processing that the pointer portion is divided, a pointed position on the subject based on a shape of the restored pointer portion, the pointed position being pointed with the pointer,
 wherein in a case in which it is judged in the judgment processing that the extracted pointer portion is not divided, the pointer portion is not restored, and in the specification processing, the pointed position is specified on the subject based on a shape of the pointer portion which has not been restored.

14. A non-transitory computer readable storage medium having a program stored thereon for controlling a computer of an image processing device, the program comprising computer-executable instructions which cause the computer to perform processing comprising:
 a first imaging processing of imaging a subject in a state in which the subject is not overlapped by a pointer to obtain a captured image as a pre-pointed image;
 a second imaging processing of imaging the subject in a state in which the subject is overlapped by the pointer to obtain a captured image as a being-pointed image;
 an extraction processing of specifying a first same-color area having a color similar to a color of the pointer in the pre-pointed image to extract a pointer portion from the being-pointed image based on the first same-color area;
 a judgment processing of judging whether or not the extracted pointer portion is divided;
 a restoration processing of restoring a dividing portion of the pointer portion using a surrounding image of the dividing portion in a case in which it is judged in the judgment processing that the pointer portion is divided; and
 a specification processing of specifying, in the case in which it is judged in the judgment processing that the pointer portion is divided, a pointed position on the subject based on a shape of the restored pointer portion, the pointed position being pointed with the pointer, wherein in a case in which it is judged in the judgment processing that the extracted pointer portion is not divided, the pointer portion is not restored, and in the specification processing, the pointed position is specified on the subject based on a shape of the pointer portion which has not been restored.

* * * * *